April 29, 1969   D. H. GIESKIENG   3,441,258
METHOD AND APPARATUS FOR PREHEATING PARTICULATE FEED
MATERIAL FOR A ROTARY KILN
Filed Oct. 5, 1967

Inventor
David H. Gieskieng
By Arthur M. Streich
Attorney

United States Patent Office 3,441,258
Patented Apr. 29, 1969

3,441,258
METHOD AND APPARATUS FOR PREHEATING PARTICULATE FEED MATERIAL FOR A ROTARY KILN
David H. Gieskieng, West Allis, Wis., assignor to Allis-Chalmers Manufacturing Company, Milwaukee, Wis.
Filed Oct. 5, 1967, Ser. No. 673,149
Int. Cl. F27b 19/00
U.S. Cl. 263—32         10 Claims

ABSTRACT OF THE DISCLOSURE

A method and apparatus is disclosed that involves directing heated kiln exit gases upwardly in a vertically ascending column within a tower. Particulate kiln feed material is fluidized and flows into the tower to gravitate downwardly countercurrent to the ascending gases. A portion of the gases is drawn off the top of the tower and fed downwardly through a recirculation network of conduit including several headers around the tower at vertically spaced levels. The headers inject the recirculating gases into the tower and dampers or a variable speed fan are operated to adjust the flow of recirculating gases to push particulate material falling adjacent inner wall surfaces of the tower inwardly toward the center of the tower and agitate the gases and solids to provide a turbulent mass for efficient heat exchange.

BACKGROUND OF THE INVENTION

Field of the invention

This invention relates to methods and apparatus for preheating particulate feed material for a rotary kiln with heated exit gases from the kiln and in particular to methods and apparatus that involve an upwardly ascending column of heated kiln exit gases with a suspension of particulate feed material gravitating downwardly in the column of gases, counter to the flow of such gases, to preheat the feed material for the kiln and cool the gases from the kiln.

Description of the prior art

Preheaters for rotary kilns known to the prior art and that involve preheating finely divided raw material suspended in and moving generally counter to the flow of heated kiln exit gases, may perhaps be conveniently considered as being of two general types. A type I involves one or more cyclone dust separators. A type II (and the type to which the present invention is directed) comprises, or includes, a vertical tower. Both types will be discussed in greater detail.

The type I, apparently earliest to be developed, includes one or more cyclone dust separators. Cold finely divided raw material is injected into heated kiln exit gases which are then passed to a cyclone separator that separates the dust from the gases. During the period of comingling heat is transferred from the gases to the small solids. This operation may be repeated one or more times to heat feed material to higher and higher temperatures preparatory to feeding the material into a kiln. Patents related to this type include Czechoslovakian Patent 48,169 of 1934; published German patent application K 156,877 of 1940; U.S. 2,648,532 and U.S. 2,663,560 of 1953; U.S. 2,733,909, U.S. 2,742,328, U.S. 2,750,182 and U.S. 2,756,981 of 1956; U.S. 2,785,886, U.S. 2,797,076, U.S. 2,797,077 and U.S. 2,802,280 of 1957, U.S. 2,863,225 and 2,866,272 of 1958; Canadian Patent 626,639 of 1961; U.S. 3,037,757 of 1962; U.S. 3,162,431 of 1964; U.S. 3,207,494 and U.S. 3,212,764 of 1965; and U.S. 3,235,239 of 1966.

Plants built according to such type I designs are all relatively complex, expensive to build, have at various locations in the systems relatively small passages which tend to clog, and lack capability or potential for a controlled preheat which leaves the operator faced with the need to adjust operation of his kiln to take what the preheater gives it.

The type II preheater involves preheating a suspension of finely divided raw material in kiln exit gases and comprises or at least includes a vertical tower with kiln gases traveling a path leading up the tower and feed material traveling a path leading down the tower and to the feed end of a rotary kiln (this is the type to which the present invention is directed). Perhaps the first U.S. patent to be granted for this type of preheater is U.S. 3,067,990 granted in the name of Zdenek Zacpal in 1962. Zacpal recognized that a vertical tower could be much less costly than a plurality of cyclone dust separators as in the described type I preheater. Zacpal also understood that flow of gases upward and fine material countercurrently downward in a vertical tower, would tend to establish a flow pattern not providing for efficient heat exchange. That is, Zacpal recognized that heavier particles would drop straight down the center of the shaft and finer particles would follow the internal wall surface, with neither size particle subjected to turbulence which provides for good heat exchange. Zacpal therefore provided funnel shaped baffles and egg-shaped vortex cores to break up the gas streams and provide turbulence. Zacpal also provided bins hung on the exterior of the tower for withdrawing from the tower fine material adjacent inner wall surfaces. The bins each have a downcomer external to the tower that reintroduces such material at a lower level under a pressure head of such material in the downcomer. The downcomers inject such material inwardly into the turbulent gas stream. Like the type I preheater, this version of a tower preheater had relatively small diameter downcomers having a potential for clogging.

A second Zacpal patent, U.S. 3,102,719 of 1963, discusses the disadvantages of designs according to the earlier Zacpal patent that resulted from material passing through downcomers where no heat exchange takes place, and this second Zacpal design dispensed with the downcomers. Although the possibility of clogged passages was avoided, this design provided no particular capability for controlling the preheater to supply what the kiln needs for most efficient operation.

Between the appearance of the first and second Zacpal patents, U.S. Patent 3,083,472 appeared with a tower having a midsection from which gas is drawn out through a cyclone and reintroduced at a higher level. Feed material passes through external downcomers before being reintroduced into the tower. This patent, like both Zacpal patents, is without provision for control and like the first Zacpal patent does have external downcomers in which no heat exchange takes place (except perhaps some unwanted cooling) and which has a potential for clogging.

U.S. Patents 3,146,998 of 1964; 3,164,380 of 1965; and British Patent 1,038,965 of 1966 provide tower preheater designs that avoid external and cloggable downcomers. These patents each show towers with internal structures or configurations designed to break up channelized flow and periodically direct material flowing down internal tower wall surfaces, inwardly of the wall surfaces to create both turbulence and a good mix of solids and gases, for good heat exchange. The internal configuration and structures shown in these patents are not however controllable in their operation.

SUMMARY OF THE INVENTION

It is an object of the present invention to provide a new and improved method and apparatus for achieving heat transfer from counterflowing heated kiln exit gases and particulate kiln feed material.

It is another object of the present invention to provide a simple, low cost and clog free apparatus for achieving heat transfer from counterflowing heated kiln exit gases and particulate kiln feed material.

Another object of the present invention is to provide a new and improved method and apparatus which can be operated to provide a measure of control for the transfer of heat from kiln exit gases to counterflowing patriculate kiln feed material.

Still another object of the present invention is to provide a new and improved method and apparatus which can be operated to moderate the temperature of kiln exit gases used to preheat feed material to avoid burning out fans and to avoid fire in the event the feed material contains combustibles.

To accomplish the aforesaid objects in a preferred manner, heated kiln gases are directed to flow upwardly in a vertically ascending column and a portion of such gases are recirculated downwardly, divided into a plurality of streams delivered to and around vertical spaced levels of the column where such recirculated gases are injected into the column of ascending gases. Raw material, finely divided into small particles, is prepared for introduction into a top portion of the column by blowing air through the material to fluidize the material. The fluidized material then flows into the top of the column of ascending gases and dropped therein to gravitate downwardly. The flow of recirculating gases injected into the column at the several vertical spaced levels is adjusted at each level to provide a sufficient flow into the column to push particulate material dropping through outer portions of the column toward the center of the column and agitate the material and gases to provide a turbulent mix of feed material with rising high temperature kiln gases and recirculated preheater gases.

Other features and objects of the invention that have been attained will appear from more detailed description to follow with reference to an embodiment of the present invention shown in the accompanying drawing.

DESCRIPTION OF THE PREFERRED EMBODIMENT

Figures 1, 2:
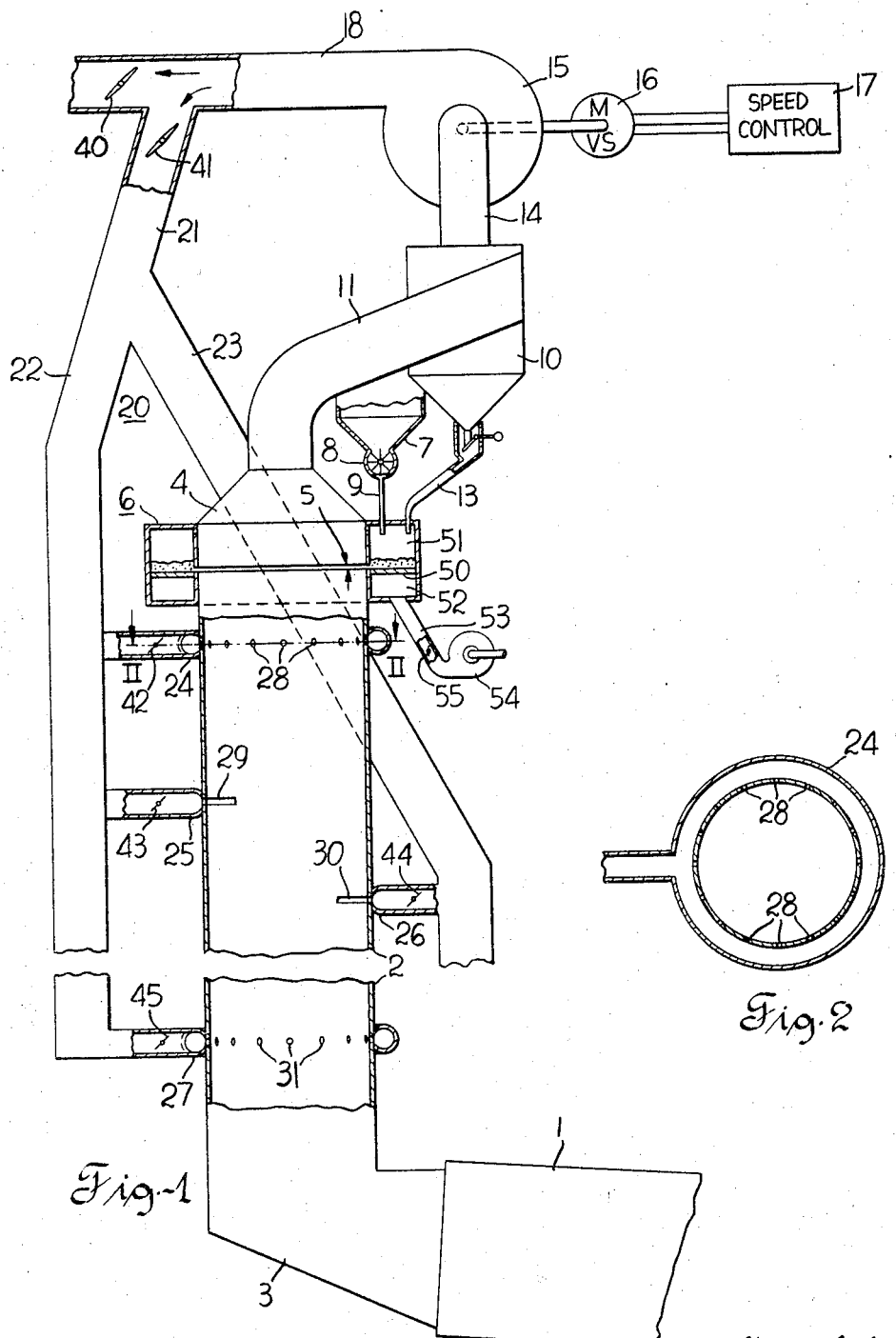
FIG. 1 of the accompanying drawing shows diagrammatically a side elevation, partly in section, a rotary kiln feed material preheater according to the present invention.
FIG. 2 is a view taken along line II—II in FIG. 1 and viewing the structure in the direction indicated by arrows.

A rotary kiln 1 and a vertical tower 2 are shown connected together by a flue structure 3 that serves both to deliver heated kiln exit gases from kiln 1 to the bottom of the tower 2 and to deliver preheated feed material from the bottom of tower 2 to the feed end of kiln 1. A hood 4 is arranged over the top of tower 2 and spaced vertically therefrom to define an annualr feed inlet 5. An annular feed box assembly 6 is arranged around a top portion of tower 2, a bottom portion of hood 4 and the annular feed inlet 5. A feed hopper 7, having a discharge opening fitted with rotary feeder 8, is connected to the feed box assembly 6 by a conduit 9.

A cyclone dust collector 10 is connected to the top of hood 4 by a conduit 11. Dust collector 10 has a material discharge opening fitted with an air lock 12 and connected by a conduit 13 to the feed box assembly 6. The dust collector 10 is connected to a gas discharge conduit 14 which is in turn connected to the gas inlet of a fan 15. The fan 15 is driven by a variable speed motor 16 provided with an adjustable speed control 17. A conduit 18 is connected to the outlet of fan 15.

A gas recirculating network 20 comprises a main gas conveying downcomer 21 connected to conduit 18 leading from the gas outlet of fan 15. The main downcomer 21 is divided into branches 22, 23 which are connected to a plurality of headers, here shown as 24, 25, 26 and 27. Headers 24 and 27 are arranged around tower 2 and provide a plurality of nozzle passages 28 and 31 passing through tower 2. Headers 25 and 26 are connected to slots 29, 30, respectively, on opposite sides of tower 2. Conduit 18 and the gas recirculating network 20 are provided with gas flow control dampers 40, 41, 42, 43, 44 and 45.

The annular feed box assembly 6 that has been referred to in the foregoing description is of a special design and construction that will now be described. The annular feed box assembly 6 is provided with an internal annular gas permeable membrane 50 that divides the box 6 into an upper chamber 51 and a lower chamber 52. An air supply pipe 53 is connected to box 6 to open into lower chamber 52. The air supply pipe 53 is connected to the gas outlet of a fan 54 and a damper 55 is provided to control the flow of air into chamber 52. Feed conduit 9 and dust return conduit 13 are both connected to box 6 to discharge into chamber 51.

In an operation according to the present invention, heated kiln gases are directed from kiln 1, through flue 3 and up tower 2. A column of gases ascend tower 2 and pass into hood 4. Conduit 11 delivers the gases from hood 4 to the dust collector 10 and a conduit 14 delivers gases from collector 10 to the gas inlet of fan 15. Conduit 18 leads gases discharged from 15 to a stack (not shown) or to additional dust collectors (not shown) and then to a stack. Feed material and collected dust are delivered by the conduits 9, 13 to the chamber 51 in feed box 6. Damper 55 is adjusted to deliver air through pipe 53 to chamber 52 under sufficient pressure to pass upwardly through the gas permeable membrane 50 to fluidize the solid particles of feed material in chamber 51 and let this material flow through the annular feed inlet 5 into the tower 2 where the material is dropped into the rising column of kiln gases made turbulent by the recirculated gases. The material dropped into the top of tower 2 gravitates downwardly and passes through flue 3 to the feed end of the rotary kiln 1. Dampers 40 and 41 are adjusted to direct a portion of the gases flowing through conduit 18 into the branches 22, 23 of the gas recirculating network 20. Dampers 42 through 45 and if desired the speed of fan 15 are then adjusted to blow sufficient recirculating gases through nozzles 28 through 31 to serve one or all of the following purposes: (1) material that is falling along the inner wall surface of tower 2 is blown inwardly toward the center of tower 2 for better heat exchange with the rising gases; (2) recirculating gases blowing into the column within tower 2 agitate the gases and solids for good mixing and turbulence, for good heat exchange; and (3) falling material is blown across the entire tower, first by gases blown through slot 29 and then by gases blown through slot 30 on the opposite side of the tower 2, to further promote turbulent mixing of gases and solids.

From the foregoing detailed description of the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A method of preheating particulate feed material for a rotary kiln with heated exit gases from the kiln, comprising the steps of directing a flow of heated kiln exit gases upwardly in a vertically ascending column, dropping particulate feed material into the top of the column of ascending gases to gravitate downwardly therethrough and then directing the fallen material into the kiln, and recirculating a portion of the gases from the top of the column of ascending gases downwardly and injecting said portion into column of ascending gases at a plurality of vertically spaced levels.

2. In a method according to claim 1, injecting the recirculated portion of the gases into the ascending column of gases from a plurality of positions around the column at each of said levels.

3. In a method according to claim 2, adjusting the flow of said recirculated gases to push particulate material falling through outer portions of said column of rising gases inward toward the center of the column and agitate said material to provide a turbulent mass of material and heated gases for efficient heat exchange therebetween.

4. In a method according to claim 1, before the feed material is dropped into the column of ascending kiln gases, another gas is blown upwardly through the feed material to fluidize the material and flow the material into the column of ascending gases where the material drops downwardly through said ascending gases in counterflow heat exchanging relation thereto.

5. An apparatus for preheating particulate material for a rotary kiln with heated exit gases from the kiln comprising a first means for directing a flow of heated kiln exit gases upwardly in a vertically ascending column, a second means for dropping particulate feed material into the top of said first means, a third means for directing material that has fallen downwardly through said first means into said kiln, and fourth means for recirculating a portion of the kiln exit gases for the top of said first means downwardly and into said first means at a plurality of vertically spaced levels.

6. An apparatus for preheating particulate material for a rotary kiln with heated exit gases from the kiln comprising a tower connected near the bottom thereof to the discharge end of a rotary kiln for directing a flow of heated kiln exit gases upwardly in a vertically ascending column, a particulate material feeder connected to the tower near the top thereof for dropping particulate feed material into said tower to gravitate downwardly therethrough and into said kiln, and a network of conduit for recirculating a portion of the kiln exit gases from the top of said tower downwardly and into said tower at a plurality of vertically spaced levels.

7. In an apparatus according to claim 6, said conduit network including a header around the tower at some of said levels and each said header having a plurality of inwardly directed gas outlets for injecting the recirculated portion of the gases into the ascending column of gases from a plurality of positions around the column at each of said levels.

8. In an apparatus according to claim 7, a plurality of adjustable dampers in said conduit network for adjusting the flow of said recirculated gases to push particulate material falling adjacent an inner wall surface of said tower inward toward the center of the tower and agitate said material to provide a turbulent mass of material and heated gases for efficient heat exchange therebetween.

9. In an apparatus according to claim 7, said conduit network including a gas recycle fan driven by a variable speed motor provided with motor controls for adjusting the operation of said motor and fan to adjust the flow of recirculated gases to push particulate material falling adjacent an inner wall surface of said tower inward toward the center of the tower and agitate the material and heated gases for efficient heat exchange therebetween.

10. In an apparatus according to claim 6, said feeder comprises an annular box arranged around a top portion of said tower, a permeable membrane dividing the box into upper and lower chambers, means for admitting gas to said lower chamber and means for admitting feed material to said upper chamber, said box defining a material discharge passage between said upper chamber and said tower, whereby gas pressure passing upwardly from said lower chamber through said permeable membrane fluidizes material in said upper chamber and blows the material into said tower.

References Cited

UNITED STATES PATENTS 2,819,890    1/1958    Rosa et al.
3,358,426    12/1967    Husbjerg.

JOHN J. CAMBY, *Primary Examiner.*

U.S. Cl. X.R.

34—10, 57; 263—53

U.S. DEPARTMENT OF COMMERCE
PATENT OFFICE
Washington, D.C. 20231

UNITED STATES PATENT OFFICE
CERTIFICATE OF CORRECTION

Patent No. 3,441,258                                                              April 29, 1969

David H. Gieskieng

It is certified that error appears in the above identified patent and that said Letters Patent are hereby corrected as shown below:

Column 5, line 9, "for" should read -- from --.

Signed and sealed this 14th day of April 1970.

(SEAL)
Attest:

Edward M. Fletcher, Jr.                      WILLIAM E. SCHUYLER, JR.
Attesting Officer                                Commissioner of Patents